US008009645B2

(12) United States Patent
Lee et al.

(10) Patent No.: US 8,009,645 B2
(45) Date of Patent: Aug. 30, 2011

(54) METHOD FOR REQUESTING AND ALLOCATING UPSTREAM BANDWIDTH IN A MULTI-HOP RELAY BROADBAND WIRELESS ACCESS COMMUNICATION SYSTEM

(75) Inventors: Sung-Jin Lee, Seoul (KR); Jung-Je Son, Seongnam-si (KR); Hyoung-Kyu Lim, Seoul (KR); Yeong-Moon Son, Anyang-si (KR); Hyun-Jeong Kang, Seoul (KR); Young-Ho Kim, Suwon-si (KR); Pan-Yuh Joo, Seoul (KR)

(73) Assignee: Samsung Electronics., Ltd. (KR)

( * ) Notice: Subject to any disclaimer, the term of this patent is extended or adjusted under 35 U.S.C. 154(b) by 762 days.

(21) Appl. No.: 11/649,019

(22) Filed: Jan. 3, 2007

(65) Prior Publication Data
US 2007/0153746 A1 Jul. 5, 2007

(30) Foreign Application Priority Data

Jan. 3, 2006 (KR) .................. 10-2006-0000613

(51) Int. Cl.
*H04W 4/00* (2009.01)
(52) U.S. Cl. ........ 370/338; 370/388; 370/389; 370/328; 370/233; 370/485; 370/441; 370/342; 370/449
(58) Field of Classification Search .................. 370/388, 370/389, 328, 233; 709/200
See application file for complete search history.

(56) References Cited

U.S. PATENT DOCUMENTS

| 1,133,113 | A | * | 3/1915 | Spratt | ........................ 379/309 |
| 3,096,617 | A | * | 7/1963 | Bryant | ..................... 239/265.13 |
| 6,327,254 | B1 | * | 12/2001 | Chuah | ........................ 370/328 |
| 6,377,548 | B1 | * | 4/2002 | Chuah | ........................ 370/233 |
| 2004/0102219 | A1 | * | 5/2004 | Bunton et al. | ................ 455/560 |
| 2004/0132458 | A1 | | 7/2004 | Bing et al. | |
| 2004/0205105 | A1 | * | 10/2004 | Larsson et al. | ................ 709/200 |
| 2005/0048914 | A1 | | 3/2005 | Sartori et al. | |
| 2005/0063330 | A1 | | 3/2005 | Lee et al. | |
| 2006/0098642 | A1 | * | 5/2006 | Mallya et al. | ................ 370/389 |

(Continued)

FOREIGN PATENT DOCUMENTS

EP 0 719 062 6/1996

(Continued)

OTHER PUBLICATIONS

IEEE Standard 802.16-2004, Oct. 1, 2004, Section 6.3.6.5, pp. 147-148.*

(Continued)

*Primary Examiner* — Kamran Afshar
*Assistant Examiner* — Shahriar Behnamian
(74) *Attorney, Agent, or Firm* — The Farrell Law Firm, P.C.

(57) ABSTRACT

A method of requesting and allocating an upstream bandwidth in an RS in a multi-hop relay BWA communication system is provided. The RS receives an upstream bandwidth request message including an upstream bandwidth from at least one MS for a predetermined time period, detects the requested upstream bandwidth from the upstream bandwidth request message, calculates a total requested upstream bandwidth by summing the requested upstream bandwidth from the at least one MS, generates a new upstream bandwidth request message including the total requested upstream bandwidth, and sends the new upstream bandwidth request message to a BS.

22 Claims, 4 Drawing Sheets

U.S. PATENT DOCUMENTS

2008/0075178 A1* 3/2008 Lappetelainen et al. ...... 375/260

FOREIGN PATENT DOCUMENTS

| | | |
|---|---|---|
| EP | 1 804 430 | 7/2007 |
| JP | 9-182141 | 7/1997 |
| JP | 9-233526 | 9/1997 |
| JP | 11-205848 | 7/1999 |
| JP | 11-266478 | 9/1999 |
| JP | 2001-026798 | 1/2001 |
| JP | 2001-034070 | 2/2001 |
| JP | 2001-053673 | 2/2001 |
| JP | 2003-179966 | 6/2003 |
| KR | 1020050040688 | 5/2005 |
| KR | 1020060112999 | 11/2006 |
| KR | 1020070056866 | 6/2007 |
| WO | WO 02/41659 | 5/2002 |
| WO | WO 2005/083920 | 9/2005 |
| WO | WO 2005/096552 | 10/2005 |
| WO | WO 2005/107306 | 11/2005 |

OTHER PUBLICATIONS

IEEE Std 802.16-2004, IEEE Standard for Local and Metropolitan Area Networks, Part 16: Air Interface for Fixed Broadband Wireless Access Systems, Oct. 1, 2004.*

Jocelyn Chow et al., Macro- and Micro-Mobility Handoffs in Mobile IP Based MBWA Networks, IEEE Communications Society, Globecom 2004.

Hung-Yu Wei et al., "Interference-Aware IEEE 802.16 WiMax Mesh Networks", Proceedings of 61st Vehicular Technology Conference (VTC 2005 Spring), Jun. 1, 2005.

* cited by examiner

METHOD FOR REQUESTING AND ALLOCATING UPSTREAM BANDWIDTH IN A MULTI-HOP RELAY BROADBAND WIRELESS ACCESS COMMUNICATION SYSTEM

PRIORITY

This application claims priority under 35 U.S.C. §119 to an application filed in the Korean Intellectual Property Office on Jan. 3, 2006 and assigned Serial No. 2006-613, the contents of which are incorporated herein by reference.

BACKGROUND OF THE INVENTION

1. Field of the Invention

The present invention relates generally to multi-hop relay Broadband Wireless Access (BWA) communication system, and in particular, to a method for requesting and allocating upstream bandwidth in a multi-hop Broadband Wireless Access (BWA) communication system.

2. Description of the Related Art

Provisioning of services with diverse Quality of Service (QoS) levels at about 100 Mbps to users is an active study area for a future-generation communication system called a $4^{th}$ Generation (4G) communication system. Particularly, active research is on going in provisioning of high-speed service by ensuring mobility and QoS to a BWA communication system such as Wireless Local Area Network (WLAN) and Wireless Metropolitan Area Network (WMAN). Major examples are Institute of Electrical and Electronics Engineers (IEEE) 802.16a and IEEE 802.16e.

IEEE 802.16a and IEEE 802.16e communication systems adopt Orthogonal Frequency Division Multiplexing/Orthogonal Frequency Division Multiple Access (OFDM/OFDMA) to the physical channels of the WMAN system. IEEE 802.16a considers only a single-cell structure with no regard to mobility of Subscriber Stations (SSs). In contrast, IEEE 802.16e supports the SS' mobility to the IEEE 802.16a communication system. Hereinafter, a mobile SS is called an MS.

Since signaling is carried out between an MS and a fixed Base Station (BS) via a direct link, a highly reliable radio communication link can be established between them in the typical IEEE 802.16e communication system. However, due to the fixedness of BSs, a wireless network cannot be configured with flexibility. As a result, IEEE 802.16e communication system is not effective in efficiently providing communication services under a radio environment experiencing fluctuating traffic distribution and great change in the number of required calls.

To avert this problem, a multi-hop relay data transmission scheme using fixed Relay Stations (RSs), mobile RSs, or general MSs is used for a general cellular wireless communication system such as IEEE 802.16e. The multi-hop relay wireless communication system can rapidly and advantageously reconfigure a network according to a changed communication environment and enables efficient operation of the whole wireless network. It can expand cell coverage and increase system capacity. If the channel status between a BS and an MS is bad, an RS is installed between them so that the resulting establishment of a multi-hop relay through the RS renders a better radio channel available to the MS. With the use of the multi-hop relay scheme at a cell boundary where the channel status is poor, high-speed data channels become available and the cell coverage is expanded.

In the multi-hop relay BWA communication system, the RSs are infrastructure RSs installed and managed by BSs or client RSs as SSs or MSs, which serve for relay. Also, the RSs can be fixed, nomadic, or mobile like MSs.

Each MS can be allocated an upstream bandwidth by sending a bandwidth request message to a BS via an RS. The RS processes the bandwidth request message between the MS and the BS. Accordingly, there is a need for defining a method for requesting and allocating an upstream bandwidth for the RS.

SUMMARY OF THE INVENTION

An aspect of the present invention is to address at least the aforementioned problems and/or disadvantages and to provide at least the advantages described below. Accordingly, an aspect of the present invention is to provide a method for requesting and allocating an upstream bandwidth in a multi-hop relay BWA communication system.

In accordance with an aspect of the present invention, there is provided a method of requesting and allocating upstream bandwidth in an RS in a BWA communication system, in which the RS receives at least one upstream bandwidth request message including an upstream bandwidth from at least one MS, respectively, for a predetermined time period, detects the requested upstream bandwidth from the at least one upstream bandwidth request message, calculates the total requested upstream bandwidth by summing the requested upstream bandwidth from the at least one MS, generates a new upstream bandwidth request message including the total requested upstream bandwidth, and sends the new upstream bandwidth request message to a BS.

In accordance with another aspect of the present invention, there is provided a method of requesting and allocating an upstream bandwidth in an RS in a BWA communication system, in which the RS receives a CDMA code indicating a requested upstream bandwidth from at least one MS for a predetermined time period, detects the requested upstream bandwidth using the CDMA code, calculates a total requested upstream bandwidth by summing the requested upstream bandwidth from the at least one MS, generates a new CDMA code indicating the total requested upstream bandwidth, and sends the new upstream bandwidth request message to a BS.

In accordance with a further aspect of the present invention, there is provided a method of requesting and allocating upstream bandwidth in an RS in a Broadband Wireless Access (BWA) communication system, in which the RS receives an upstream bandwidth request message including a requested upstream bandwidth from an MS, relays the upstream bandwidth request message to a BS, is allocated an upstream bandwidth from the BS, and allocates the requested upstream bandwidth to the MS using the allocated upstream bandwidth.

In accordance with still another aspect of the present invention, there is provided a method of requesting and allocating an upstream bandwidth in an RS in a Broadband Wireless Access (BWA) communication system, in which the RS receives a CDMA code indicating a requested upstream bandwidth from an MS, relays the CDMA code to a BS, is allocated an upstream bandwidth from the BS, and allocates the requested upstream bandwidth to the MS using the allocated upstream bandwidth.

In accordance with still further aspect of the present invention, there is provided an apparatus for requesting and allocating an upstream bandwidth from an RS in a BWA communication system, in which at least one MS generates an upstream bandwidth request message including an upstream bandwidth and sends the upstream bandwidth request message to the RS, the RS receives the upstream bandwidth request message from at least one MS for a predetermined time period, detects the requested upstream bandwidth from the upstream bandwidth request message, calculates the total requested upstream bandwidth by summing the requested upstream bandwidth from the at least one MS, generates a new upstream bandwidth request message including the total requested upstream bandwidth, and sends the new upstream bandwidth request message to a BS, and the BS allocates an upstream bandwidth to the RS by scheduling.

In accordance with yet another aspect of the present invention, there is provided an apparatus for requesting and allocating an upstream bandwidth from an RS in a BWA communication system, in which at least one MS generates a CDMA code indicating a requested upstream bandwidth and sends the CDMA code to the RS, the RS receives the CDMA code from the at least one MS for a predetermined time period, detects the requested upstream bandwidth using the CDMA code, calculates the total requested upstream bandwidth by summing the requested upstream bandwidth from the at least one MS, generates a new CDMA code indicating the total requested upstream bandwidth, and sends the new CDMA code to a BS, and the BS allocates and schedules the upstream bandwidth to the RS.

In accordance with yet a further aspect of the present invention, there is provided an apparatus for requesting and allocating an upstream bandwidth from an RS in a BWA communication system, in which an MS generates and requests an upstream bandwidth request message and sends the upstream bandwidth request message to the RS, the RS relays the upstream bandwidth request message to a BS and, when the RS is allocated an upstream bandwidth from the BS, allocates the requested upstream bandwidth to the MS using the allocated upstream bandwidth, and the BS allocates the upstream bandwidth to the RS by scheduling.

In accordance with yet a further aspect of the present invention, there is provided an apparatus for requesting and allocating an upstream bandwidth from an RS in a BWA communication system, in which an MS generates a CDMA code indicating a requested upstream bandwidth and sends the CDMA code to the RS, the RS relays the CDMA code to a BS and, when the RS is allocated an upstream bandwidth from the BS, allocates the requested upstream bandwidth to the MS using the allocated upstream bandwidth, and the BS allocates and schedules the upstream bandwidth to the RS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for requesting and allocating an upstream bandwidth in a multi-hop relay BWA communication system. While the present invention is described in the context of the BWA communication system, it is to be clearly understood that the present invention is also applicable to any multi-hop relay cellular communication system.

Figure 1:
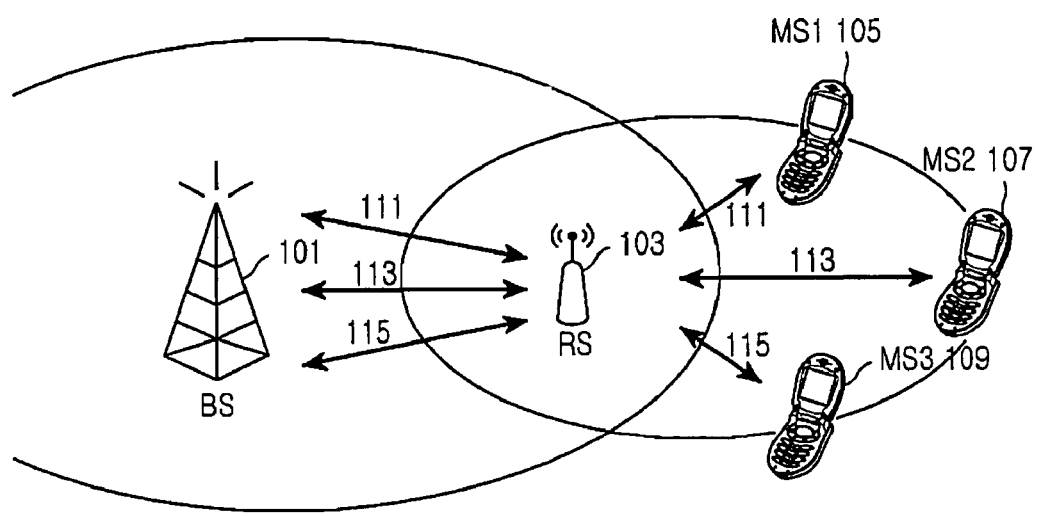
FIG. 1 is a system overview of a method for requesting and allocating an upstream bandwidth in a multi-hop relay BWA communication system according to the present invention.

Referring to FIG. 1, a plurality of MSs 105, 107 and 109 send upstream bandwidth request messages 111, 113 and 115 to an RS 103 and the RS 103 simply relays the upstream bandwidth request messages 111, 113 and 115 to a BS 101. That is, RS 103 retransmits data between BS 101 and MSs 105, 107 and 109. BS 101 allocates requested bandwidths to MSs 105, 107 and 109 through scheduling. In this way, MSs 105, 107 and 109 are allocated their requested bandwidths. The bandwidth requesting and allocation will be described in more detail with reference to FIG. 2.

Figure 2:
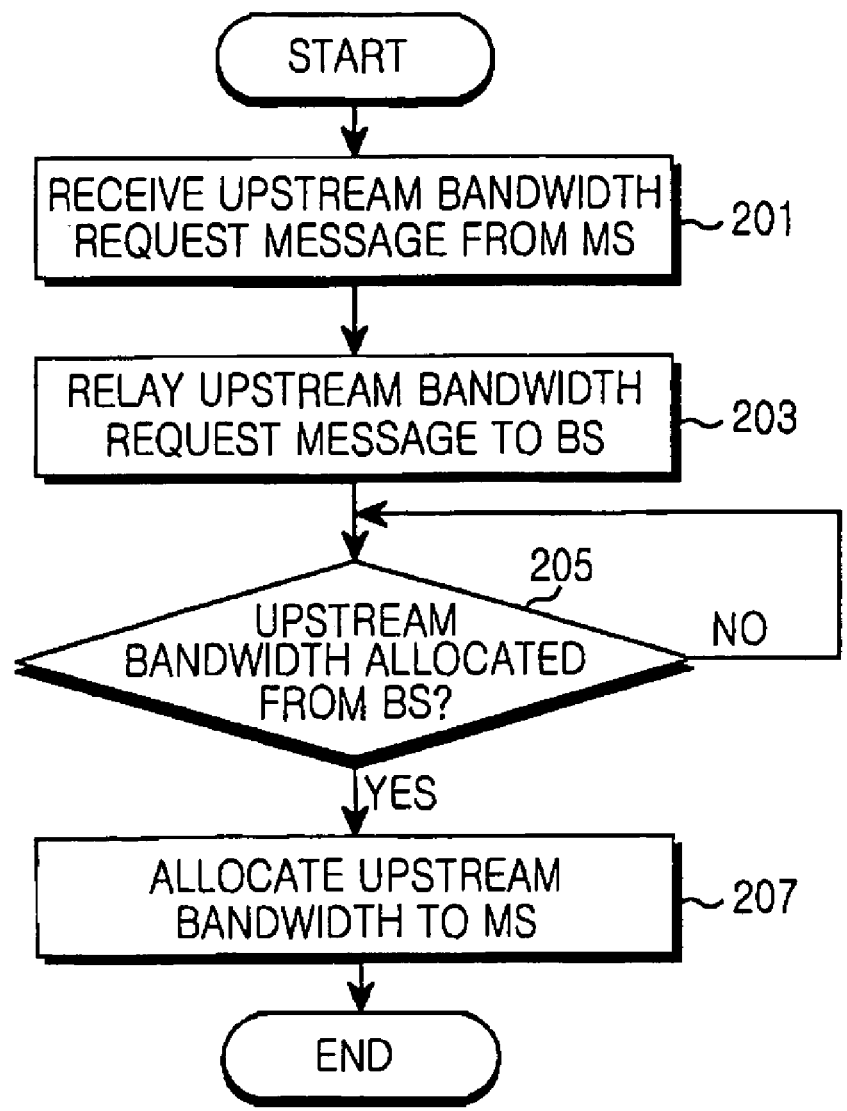
FIG. 2 is a flowchart for requesting and allocating an upstream bandwidth in an RS in the multi-hop relay BWA communication system according to the present invention.

Referring to FIG. 2, RS 103 receives an upstream bandwidth request message from MS 105 in step 201 and relays the received message to BS 101 in step 203. BS 101 can allocate an upstream bandwidth to MS 105 by scheduling.

The upstream bandwidth request message has the following configuration.

TABLE 1

| Field | Value |
|---|---|
| Message type | Code value representing the upstream bandwidth request message |
| Requested upstream bandwidth | The size of requested upstream bandwidth (in bytes) |

In Table 1, Message Type identifies the transmitted message. That is, a code value representing the upstream bandwidth request message is filled in the field of Message Type. Since a requested upstream bandwidth is notified through the upstream bandwidth request message, the upstream bandwidth request message includes the requested upstream bandwidth field indicating the size of a requested upstream bandwidth.

In step 205, RS 103 determines whether BS 101 has allocated the upstream bandwidth. If the upstream bandwidth has been allocated, RS 103 allocates the upstream bandwidth to MS 205 in step 207. Then RS 103 ends the procedure.

Figure 3:
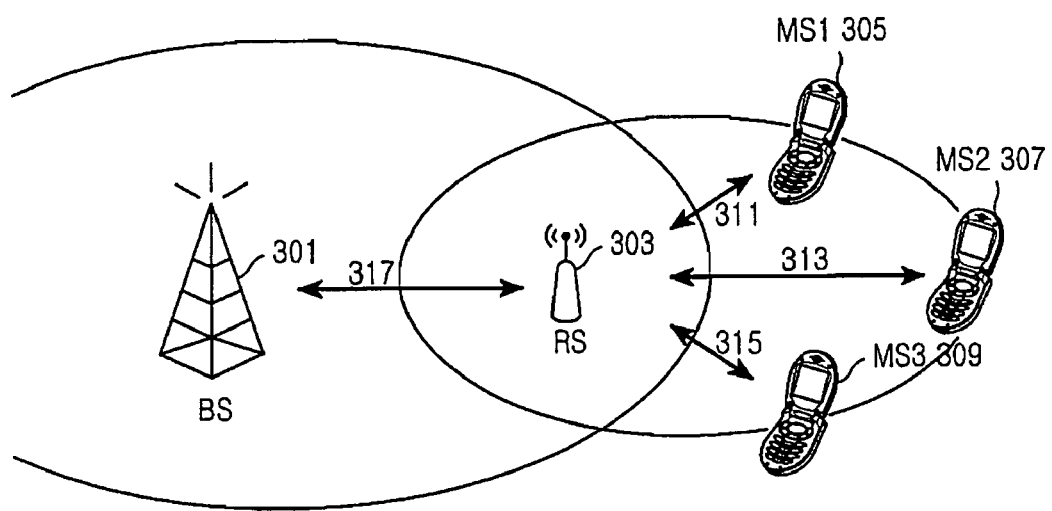
FIG. 3 is a system overview of a method for requesting and allocating an upstream bandwidth in a multi-hop relay BWA communication system according to the present invention.

Referring to FIG. 3, a plurality of MSs 305, 307 and 309 send upstream bandwidth request messages to an RS 303. The upstream bandwidth request messages each include a requested bandwidth as illustrated in Table 1. RS 303 detects the upstream bandwidths requested by MSs 305, 307 and 309, sums them, and generates a new upstream bandwidth request message 317 having a field set to a total bandwidth requested within the cell, instead of the field indicating an upstream bandwidth requested by a particular MS illustrated in Table 1.

RS 303 then sends the new upstream bandwidth request message 317 to BS 301. BS 301 allocates the upstream bandwidth requested by RS 303. RS 303 divides the allocated upstream bandwidth and allocates the divided bandwidths to MSs 305, 307 and 309. This upstream bandwidth requesting and allocation operation will be detailed below with reference to FIG. 4.

Figure 4:
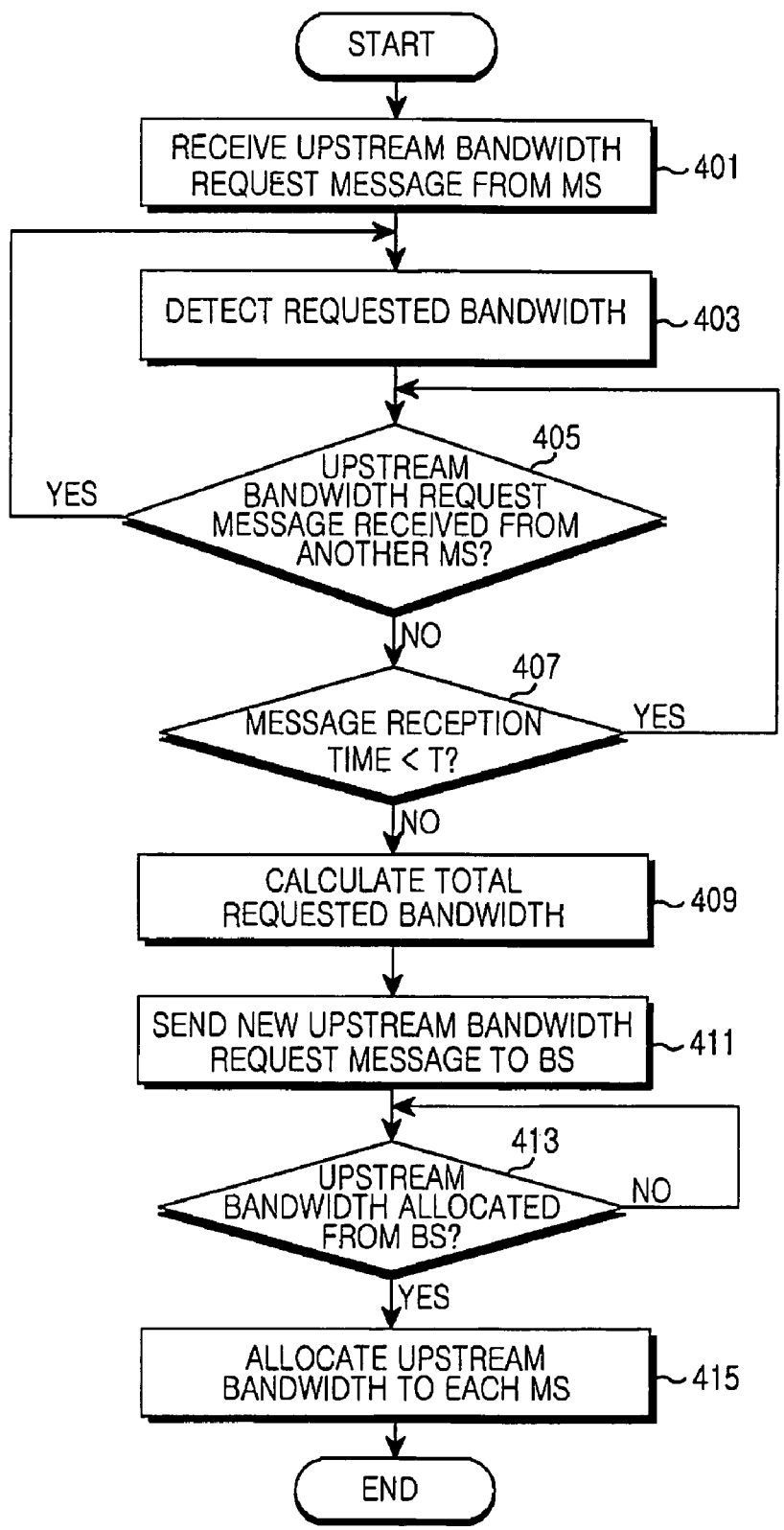
FIG. 4 is a flowchart for requesting and allocating an upstream bandwidth in the multi-hop relay BWA communication system according to the present invention.

Referring to FIG. 4, RS 303 receives upstream bandwidth request messages from MSs 305, 307 and 309 in step 401. In step 403, RS 303 detects bandwidths requested by respective MSs 305, 307 and 309, checks the Quality of Service (QoS) levels of services requested by respective MSs 305, 307 and 309, and stores the requested bandwidths and QoS levels as information in a memory.

RS 303 monitors reception of an upstream bandwidth request message from any other MS in step 405. Upon receipt of another upstream bandwidth request message, RS 303 returns to step 403 in which it detects an upstream bandwidth requested by the MS and stores the requested bandwidth in the memory. If no more upstream bandwidth request message is received, RS 303 compares a message reception time for which it has received the upstream bandwidth request messages with a predetermined reception time T in step 407. T may be varied according to the wireless communication system and communication conditions. If the message reception time is shorter than T, RS 303 returns to step 405 in which it continues to receive upstream bandwidth request messages from other MSs until the predetermined reception time T elapses.

If the message reception time is greater than or equal to T, RS 303 sums the requested upstream bandwidths in step 409. In step 411, RS 303 generates an upstream bandwidth request message including a total upstream bandwidth based on the sum and sends it to BS 301. The total bandwidth may be the sum of the upstream bandwidths requested by the MSs and an upstream bandwidth requested by RS 303. Also, the total bandwidth can be calculated, taking into account the QoS and priority levels of the services of the MSs and the upstream bandwidths requested by the MSs. BS 301 allocates the requested total upstream bandwidth to RS 303.

In step 413, RS 303 determines whether BS 301 has allocated the requested upstream bandwidth. If the upstream bandwidth has been allocated, RS 303 divides the allocated upstream bandwidth for the MSs according to the stored bandwidths requested by the MSs and the QoS and priority levels of the MSs and allocates the divided upstream bandwidths to the MSs in step 415. Then RS 303 ends the procedure.

In accordance with the present invention, the RS receives upstream bandwidth request messages each including a requested upstream bandwidth from one or more MSs for a predetermined time period. The RS then simply relays the upstream bandwidth request messages to the BS. Alternatively, the RS calculates the sum of the upstream bandwidths requested by the MSs, generates a new upstream bandwidth request message including the total requested upstream bandwidth, and sends the new upstream bandwidth request message. Besides requesting the bandwidth using a message, it can be further contemplated that an upstream bandwidth is requested using a predetermined Code Division Multiple Access (CDMA) code.

For example, MSs generate predetermined CDMA codes indicating intended upstream bandwidths and send the CDMA codes to the RS. The RS simply relays the CDMA codes to the BS. Alternatively, the RS calculates a required total upstream bandwidth using CDMA codes received for a predetermined time, generates a predetermined CDMA code indicating the total upstream bandwidth, and sends the CDMA code to the RS. The MSs and the RS may generate CDMA codes, or select CDMA codes from a predetermined CDMA code table in which CDMA codes are mapped to upstream bandwidths.

CDMA code-based upstream bandwidth request and allocation can be made in a different manner. A default upstream bandwidth is preset among the MSs, the RS and the BS. The MSs each send a predetermined CDMA code indicating the number of requested default bandwidths to the RS. The RS simply relays the CDMA codes to the BS. Alternatively, the RS calculates the number of requested default upstream bandwidths from CDMA codes received for a predetermined time, generates a predetermined CDMA code indicating the number of the requested default upstream bandwidths, and sends the CDMA code to the BS. The MSs and the RS can generate CDMA codes, or select CDMA codes from a predetermined CDMA code table in which CDMA codes are mapped to numbers of default upstream bandwidths.

As is apparent from the above description, the present invention provides an upstream bandwidth request and allocation method for a multi-hop relay BWA communication system, in which an RS collects upstream bandwidths requested by MSs within its cell area, generates an upstream bandwidth request message including the total requested upstream bandwidth based on the MSs-requested upstream bandwidths, sends the upstream bandwidth request message to the BS, and then relays (allocates an upstream bandwidth allocated by the BS) to the MSs. Although the MSs send a plurality of upstream bandwidth request messages to the RS, the RS relays the upstream bandwidth requests to the BS in a single upstream bandwidth request message. Therefore, radio resources are saved and efficiently managed between the RS and the BS.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method of requesting and allocating an upstream bandwidth by a Relay Station (RS) in a wireless communication system, comprising:
   receiving at least one upstream bandwidth request message including a requested upstream bandwidth from at least one Mobile Station (MS), respectively, for a time period;
   calculating, by the RS, a total requested upstream bandwidth by summing the requested upstream bandwidth from the at least one MS;
   generating, by the RS, a new upstream bandwidth request message including the total requested upstream bandwidth; and
   sending, by the RS, the new upstream bandwidth request message to a Base Station (BS).

2. The method of claim 1, wherein the total requested bandwidth includes an upstream bandwidth requested by the RS.

3. The method of claim 1, further comprising checking a Quality of Service (QoS) level requested by the at least one MS and a priority level of the at least one MS, and storing the QoS level and the priority level.

4. The method of claim 1, further comprising, allocating the upstream bandwidth to the at least one MS according to the upstream bandwidth requested by the at least one MS when the RS is allocated an upstream bandwidth from the BS.

5. The method of claim 1, further comprising storing the detected upstream bandwidth.

6. A method of requesting and allocating an upstream bandwidth by a Relay Station (RS) in a wireless communication system, comprising:
- receiving, by the RS, a Code Division Multiple Access (CDMA) code indicating a requested upstream bandwidth from at least one Mobile Station (MS), respectively, for a time period;
- calculating, by the RS, a total requested upstream bandwidth by summing the requested upstream bandwidth from the at least one MS;
- generating, by the RS, a new CDMA code indicating the total requested upstream bandwidth; and
- sending, by the RS, the new CDMA code to a Base Station (BS).

7. The method of claim 6, wherein the total requested bandwidth includes an upstream bandwidth requested by the RS.

8. The method of claim 6, further comprising checking a Quality of Service (QoS) level requested by the at least one MS and a priority level of the at least one MS, and storing the QoS level and the priority level.

9. The method of claim 6, further comprising, allocating the upstream bandwidth to the at least one MS according to the upstream bandwidth requested by the at least one MS when the RS is allocated an upstream bandwidth from the BS.

10. The method of claim 6, further comprising storing the detected upstream bandwidth.

11. The method of claim 6, wherein generating the new CDMA code indicating the total requested upstream bandwidth comprises selecting a new CDMA code mapped to the total requested upstream bandwidth from a CDMA code table.

12. The method of claim 7, wherein the upstream bandwidth requested by the at least one MS is preset.

13. A system for requesting and allocating an upstream bandwidth from a Relay Station (RS) in a wireless communication system, comprising:
- at least one Mobile Station (MS) for generating an upstream bandwidth request message including a requested upstream bandwidth and sending the upstream bandwidth request message to the RS;
- the RS for receiving the upstream bandwidth request message from the at least one MS for a time period, calculating a total requested upstream bandwidth by summing the requested upstream bandwidth from the at least one MS, generating a new upstream bandwidth request message including the total requested upstream bandwidth, and sending the new upstream bandwidth request message to a Base Station (BS); and
- the BS for allocating and scheduling the upstream bandwidth to the RS.

14. The system of claim 13, wherein the RS allocates the upstream bandwidth to the at least one MS according to the upstream bandwidth requested by the at least one MS when the BS allocates the upstream bandwidth to the RS.

15. The system of claim 13, wherein the RS checks a Quality of Service (QoS) level requested by the at least one MS and a priority level of the at least one MS, stores the QoS level and the priority level, and calculates the requested upstream bandwidth, based on the QoS level and the priority level of the at least one MS when the RS receives the upstream bandwidth request message from the at least one MS.

16. The system of claim 13, wherein the RS calculates the total requested bandwidth to include an upstream bandwidth requested by the MS.

17. A system for requesting and allocating an upstream bandwidth from a Relay Station (RS) in a wireless communication system, comprising:
- at least one Mobile Station (MS) for generating a Code Division Multiple Access (CDMA) code indicating a requested upstream bandwidth and sending the CDMA code to the RS;
- the RS for receiving the CDMA codes from the at least one MS for a time period, calculating a total requested upstream bandwidth by summing the requested upstream bandwidth from the at least one MS, generating a new CDMA code indicating the total requested upstream bandwidth, and sending the new CDMA code to a Base Station (BS); and
- the BS for allocating and scheduling the upstream bandwidth to the RS.

18. The system of claim 17, wherein the RS allocates the upstream bandwidth to the at least one MS according to the upstream bandwidth requested by the at least one MS when the BS allocates the upstream bandwidth to the RS.

19. The system of claim 17, wherein the RS checks a Quality of Service (QoS) level requested by the at least one MS and a priority level of the at least one MS, stores the QoS level and the priority level, and calculates the requested upstream bandwidth, based on the QoS level and the priority level of the at least one MS when the RS receives the CDMA code from the at least one MS.

20. The system of claim 17, wherein the RS calculates the total requested bandwidth to include an upstream bandwidth requested by the RS.

21. The system of claim 17, wherein the RS selects the new CDMA code mapped to the total requested upstream bandwidth from a CDMA code table.

22. The system of claim 17, wherein the upstream bandwidth requested by the at least one MS is preset.

* * * * *